UNITED STATES PATENT OFFICE.

ORAZIO LUGO, OF NEW YORK, N. Y.

SECONDARY BATTERY.

SPECIFICATION forming part of Letters Patent No. 396,213, dated January 15, 1889.

Application filed June 20, 1888. Serial No. 277,673. (No specimens.)

*To all whom it may concern:*

Be it known that I, ORAZIO LUGO, a citizen of the United States, residing in New York, county of New York, and State of New York, have made a new and useful Invention in Secondary or Polarization Batteries, of which the following is a specification.

My invention relates to improvements in that branch of the electrical art known as "secondary" or "polarization" batteries, which are first charged from some extraneous electrical source and then connected to the translating devices it is desired to operate by electricity.

To this end it consists in novel methods or processes of preparing a novel substance designed for use around or in contact with the electrodes of the battery or itself constituting the electrodes, said substance being of such a nature that when the poles or electrodes of the battery are connected to a charging-source of the required electro-motive force the gases evolved electrolytically at said poles or electrodes or through said substance will be occluded or absorbed as such—that is to say, oxygen will be developed and absorbed or occluded at the same moment at the anode or positive pole, and hydrogen will be developed and absorbed or occluded at the cathode or negative pole without detrimental resulting chemical action upon the substance itself or the electrode.

Prior to my invention it was old in the art to decompose an electrolytic fluid into its constituent gases—oxygen and hydrogen—and to store the gases so decomposed in independent vessels, and then recombine these gases, thereby reconverting them into their original or combined state and at the same time producing an electrical current. This type of battery is known in the art as a "gas-battery," and I make no claim to the broad idea of such a construction or to the processes involved in its use; nor do I claim in this application either the novel substance created by the processes herein enumerated and claimed or the novel battery herein described, said features constituting the subject-matter of a separate application for a patent, filed by me in the United States Patent Office on the 4th day of September, 1888, and bearing Serial No. 284,559, the present application being limited solely to the processes or methods described and claimed hereinafter.

My present improvement lies in the several processes, both generic and specific, by which I produce the substance above referred to for use in storage-batteries, said processes being particularly pointed out in the claims which follow this specification.

In order that my invention may be fully understood, I will now proceed to describe the best processes and means known and employed by me at present for putting it into practical use.

I first prepare as one of the occluding substances an allotropic material, preferably allotropic or finely-divided or spongy lead. This allotropic material is produced by a novel process, which I will describe later on. I then immerse this material in a bath or solution of such a metallic salt as will precipitate the metal of the salt upon the whole spongy surface of the allotropic or finely-divided material. This material when so prepared with two occluding elements superposed upon each other constitutes the gas occluding or absorbing substance and is indestructible under the electric action of charging or discharging. It is not only indestructible, but has also the property of occluding or absorbing much greater quantity of the gases than if constituted of the same weight of a single occluding element of metal, this property being somewhat analogous to that of alloys and their separate elementary metals in metallurgy. While this substance, which is also amorphous, has the property of occluding or absorbing such gases as oxygen and hydrogen when evolved through itself, it will not be oxidized by the nascent oxygen or reduced to a different form by the nascent hydrogen or acted upon by any of the combinations which hydrogen and oxygen in their nascent state may form—such, for instance, as peroxide of hydrogen.

I will now describe in detail the entire procedure involved in the preparation of my improved gas-occluding material and its application and use in a secondary or polarization battery, taking as a type those elementary substances which appear to me to give the best results and at the same time be produced at a minimum cost.

I first prepare one of the allotropic materials—preferably spongy or porous lead—as follows: I take two or three chemical equivalents of chloride of sodium (NaCl) and mix them in a dry pulverized state with one chemical equivalent of acetate of lead (PbO.$C_4H_4O_4$.) I then dampen the mixture and mix it still further, after which I dissolve it in water. This mixing process is carried on, preferably, in a vessel having a lead lining. Metallic zinc (Zn) is now suspended or immersed in this solution and the following reaction takes place: The act of mixing the acetate of lead (PbO.$\bar{A}$) and chloride of sodium (NaCl) formed acetate of soda (NaO.$\bar{A}$) and chloride of lead (PbCl.) The excess of the chloride of sodium (NaCl) in the mixture after the formation of acetate of soda (NaO.$\bar{A}$) and chloride of lead (PbCl) acts as a solvent of the chloride of lead, (PbCl) and when the zinc is immersed in the solution the chlorine (Cl) of the chloride of lead (PbCl) acts upon the zinc, (Zn,) thereby forming chloride of zinc, (ZnCl,) and at the same time depositing metallic lead (Pb) on the surface of the zinc, (Zn,) said metallic lead being in an extremely divided or spongy or allotropic condition. When this reaction is completed, the mother-liquid is withdrawn and a diluted solution of sulphate of copper ($CuO.SO_3$) is introduced into the vessel containing the allotropic or spongy lead. The introduction of this sulphate of copper causes metallic copper to be deposited upon the surface of the divided or spongy lead. This substance produced by the precipitation of the copper upon the exceedingly finely-divided lead, which division approaches very closely to atomic division, is now bimetallic in its nature, and is in such a state of chemical equilibrium as to resist either oxidation or change of form due to contact only in contradistinction to a combined state, such as exists in an alloy of two metals; or, in other words, their chemical affinities are entirely satisfied by contact, so that no difference in electrical potential exists between these metals, and therefore in this case no oxidation or change of form can take place. This substance is now pressed sufficiently to remove the excess of liquid or the solution remaining in it, and is ready for use in the battery. In practice I pack it tightly around the electrodes, consisting of metallic or metalloid plates located in porous jars, said plates having the usual binding-posts and connections. Both electrodes so constructed are then immersed in an electrolytic solution, preferably dilute ($SO_3$) sulphuric acid. I do not, however, limit myself to any special construction of electrode or any special combination of this improved gas absorbing or occluding substance with any special kind of electrode or electrolyte, as it may be used with any such form or construction as may suggest itself, or may be used as an electrode *per se* when connected directly to the poles of the battery and with usual electrolytes; nor do I limit myself to the special metallic salts herein named from which this substance or material is composed, as it is obvious other metallic salts may be used—as, for example, acetate of silver (AgO.$\bar{A}$) may supplant the lead salt, from which reaction allotropic or spongy or finely-divided metallic silver will result. Other metallic salts having the properties of the two metallic salts named may of course be used instead.

Instead of the solution of sulphate of copper, from which metallic copper is deposited on the allotropic lead, I may substitute a salt of nickel or any other metallic salt which when used would deposit the metal of the salt upon the allotropic lead or silver or other material used.

The operation of my improved battery is at once obvious, as in charging oxygen is generated at the anode and absorbed by the occluding or absorbing substance, hydrogen being generated and occluded or absorbed at the cathode. After the battery is fully charged, which will be determined when it begins to give off the free oxygen and hydrogen gases in natural state, the absorbing material refusing to take more than its occluding capacity, it may be disconnected from the charging source and used in the well-known manner.

I have found that such a battery may stand for months and lose none of its charge, the gases being held securely in their occluded or absorbed state and no chemical action being noticeable in the cell, the action being purely physical in its nature.

Having thus described my invention, what I claim, and desire to secure by Letters Patent of the United States, is—

1. The described process of preparing spongy or divided material for use in secondary or polarization batteries, which consists in mixing two metallic salts, then putting them in solution, and finally subjecting zinc to the action of this solution, substantially as described.

2. The described process of preparing spongy or divided lead for use in secondary or polarization batteries, which consists in mixing chloride of sodium with acetate of lead, then putting them in solution, and finally subjecting zinc to the action of this solution, substantially as described.

3. The described process of preparing a substance for occluding or absorbing the gases evolved in charging a secondary or polarization battery, which consists in superposing two finely-divided elements upon each other, substantially as described.

4. The described process of preparing a substance for occluding or absorbing the gases evolved in charging a secondary or polarization battery, which consists in superposing two finely-divided metals, substantially as described.

5. The described process of preparing a substance for occluding or absorbing the gases evolved in charging a secondary or polarization battery, consisting in creating a finely-divided or spongy mass of material, then superposing a second material upon or throughout the mass of the first named material, substantially as described.

ORAZIO LUGO.

Witnesses:
    H. H. ELDRECH,
    J. CREIGHTON WEBB.